Oct. 6, 1964    D. J. BUNGER ETAL    3,151,452
ELECTRO-MECHANICAL CONTROL FOR AIR BREATHING STARTER
Filed Oct. 22, 1962    2 Sheets-Sheet 1

INVENTORS
DENNEN J. BUNGER
JOHN H. FERGUSON, JR.
BY Robert W. Ely
ATTORNEY

United States Patent Office 3,151,452
Patented Oct. 6, 1964

3,151,452
ELECTRO-MECHANICAL CONTROL FOR AIR BREATHING STARTER
Dennen J. Bunger, Whitesboro, and John H. Ferguson, Jr., Utica, N.Y., assignors to The Bendix Corporation, Utica, N.Y., a corporation of Delaware
Filed Oct. 22, 1962, Ser. No. 232,167
5 Claims. (Cl. 60—39.14)

This invention relates to starters for jet engines and more particularly concerns air breathing starting systems and controls therefor which include an initiator motor, an air-breathing, compressor-turbine gas generator, and a gas turbine starter unit releasibly-connectible to a jet engine.

An object of the present invention is to provide an improved air breathing starting system and controls therefor in which electrical means safely and reliably initiates and controls the operation of a compressor-turbine gas generator and turbine starter unit having speed reduction means and coupling means for suitable connection to a jet engine of an aircraft, for example.

A further object is the provision of such a starting system and controls in which an electrical generator is suitably incorporated to provide electricity for the combustion in the gas generator and elsewhere.

An additional object is to provide such a starting system and controls in which combustion pressure, predetermined speeds, and a high combustion temperature will operate relays, fuel valves and other means to provide safe and reliable start-up, proper wind-up and safe cut-out and to prevent recycling.

Figure 1:
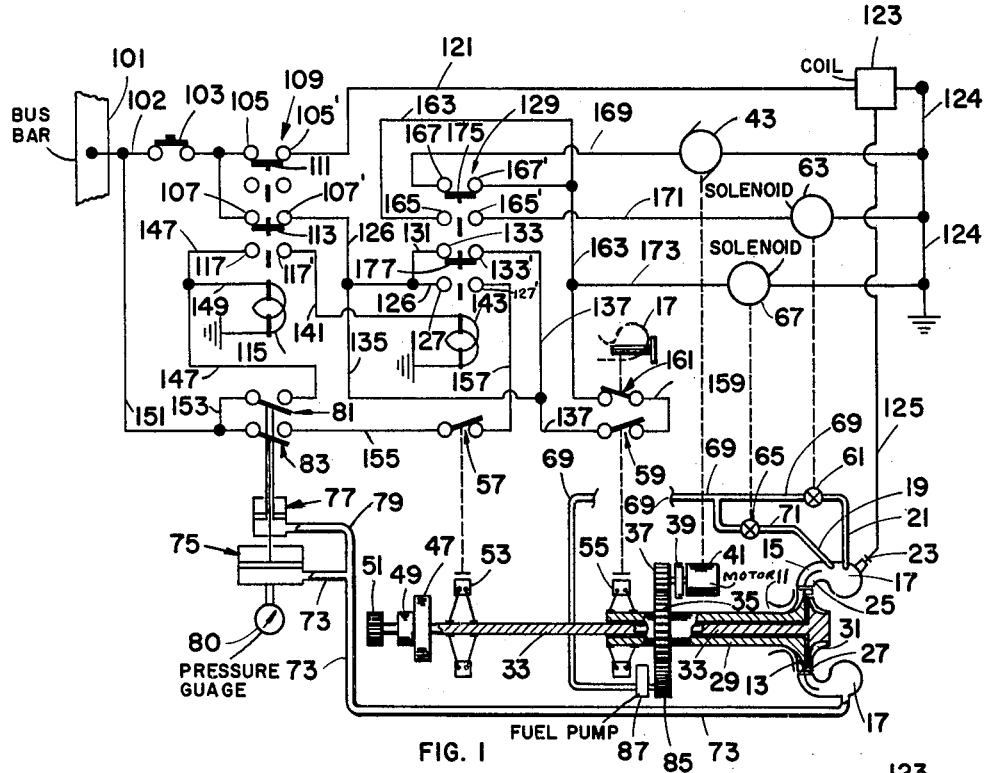
Figure 2:
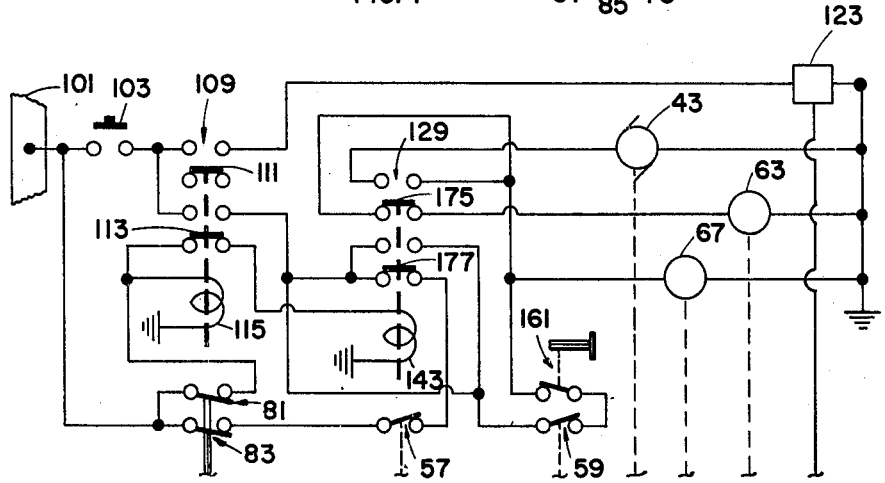
Figure 3:
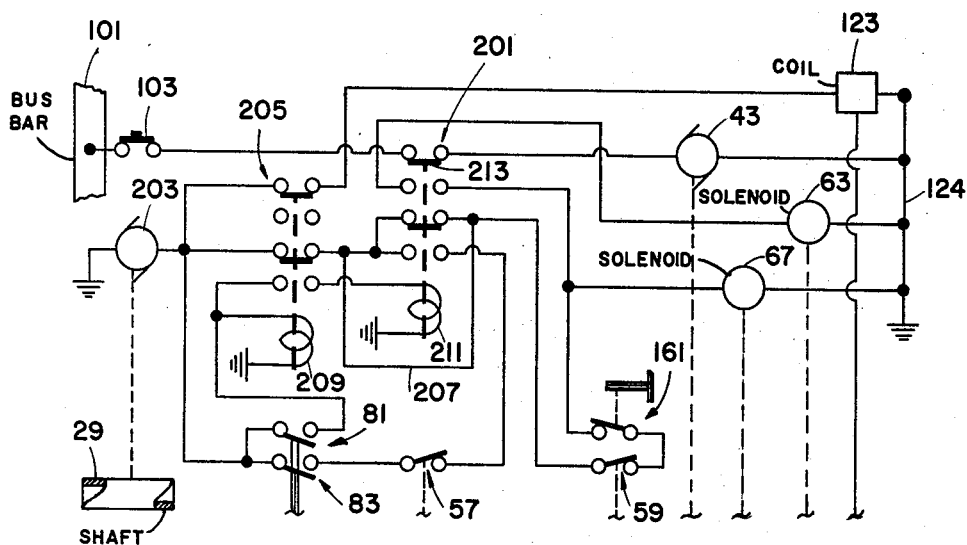
Figure 4:
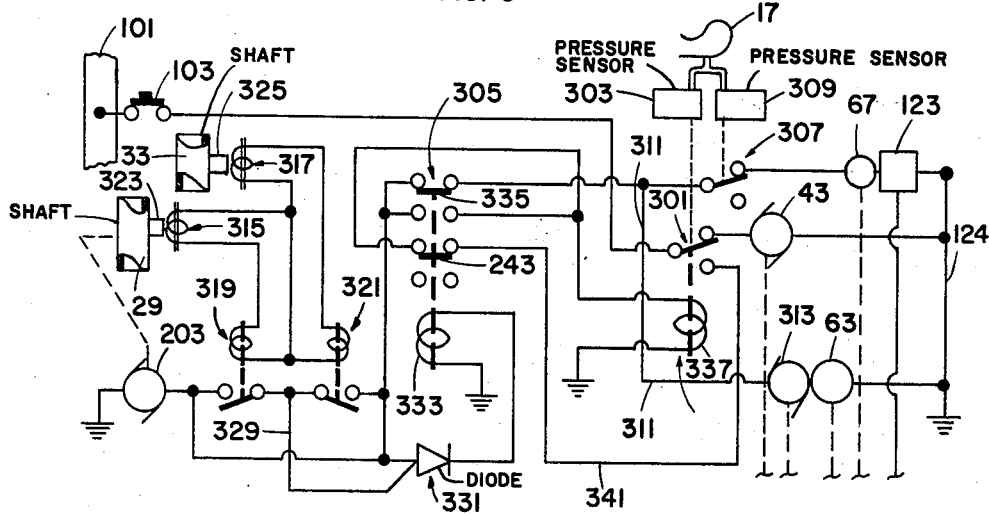

The realization of the above objects along with the features and advantages of this invention will be apparent from the following description and accompanying drawings in which:

FIGURE 1 is schematic showing of a starting system having an electric initiator motor arranged to start up a compressor-turbine combustion unit which powers a turbine arranged to rotate through an epicyclic gearing a jet engine to starting speed, FIGURE 2 is diagrammatic showing of certain of the FIGURE 1 elements and controls therefor which include relay switches and other switches arranged to control an initiator motor, an ignitor, and two fuel valves in response to combustion pressure, temperature, and turbine speeds, FIGURE 3 is diagram including a generator in addition to the elements of FIGURE 2, and FIGURE 4 is diagram including some of the FIGURE 3 elements but having electric speed responsive means.

Referring to FIGURE 1 of the drawing, it can be seen at the bottom thereof, that a schematic representation of a starter system hving a turbocompressor gas generator and a starter unit with a free turbine has been shown. An air inlet 11 is provided for directing air to the compressor 13 which discharges into the annular inlet channel 15 of the annular combustion chamber 17. The compressed air in the combustion chamber is mixed with fuel from spray nozzles 19 and 21 and ignited by spark plug 23. The combustion products are discharged from the combustion chamber 17 to the curved annular outlet duct 25 having sonic nozzles (not shown). These hot combustion products pass through the compressor turbine 27 which is an integral part of the compressor 13. Compressor 13 and gas-producing turbine 27 can be referred to as a turbocompressor unit. This unit has a tubular shaft 29 extending axially to the left. The gas discharged from the turbine 27 enters a radially-inwardly-flowing, free turbine 31. The free, power-producing turbine 31 has a solid shaft 33 extending to the left and encased by the turbocompressor shaft 29 which terminates midway of shaft 33. Hollow shaft 29 provides support for the power shaft 33 by means of a bearing threbetween, such as an air bearing. Shaft 33 extends to the left beyond the shaft 29. Shaft 29 has mounted thereon a gear 35 which meshes with an initiator gear 37. Gear 37 is connected through an overrunning clutch 39 to an electric initiator motor 41 which is linked by a vertical dashed line to its current pick-up device 43. Shaft 33 has, at its left end, planetary-geared, speed-reducing means 47 and an overrunning clutch 49. The sprag-type, overrunning clutch 49 has connected thereto an externally-splined shaft 51 for connection to a jet engine (not shown). A first centrifugally-operated speed sensing device 53 is operatively associated with drive shaft 33. A second centrifugally-operated speed sensing device 55 is operatively associated with tubular shaft 29. Speed sensors 53 and 55 are mechanically linked to electric switches 57 and 59 respectively whereby at a predetermined speed of turbine 31 and at predetermined speed of turbine 13 the switches respectively will be open.

At the right, a first, anti-dribble, fuel control valve 61 is linked by a dashed line to its operating solenoid 63. A second, anti-dribble, fuel control valve 65 is linked by a dashed line to its solenoid 67. Starting fuel control valve 61 is located at the main fuel supply line 69. Initiating fuel valve 65 is located in the initiating fuel supply line 71, branching from pipe 69. A gas duct 73 extends from the annular combustion chamber 17 at the right and connects at the left to a piston-type control device 75 and also to another piston-type control device 77 by means of a branch conduit 79. A pressure gage 80 is connected to device 75 to provide means for indicating self-sustaining combustion in combustor 17. The piston control 77 is mechanically linked to a switch 81. Piston-control device 75 is mechanically linked to electrical switch 83. Gear 35 on tubular shaft 29 also meshes with a gear 85 which connects to and drives a fuel pump 87 in fuel supply line 69. Pump 87 is connected to the vehicle fuel tanks by means which are not shown and has built in a check-valved, by-pass to give a predetermined fuel pressure.

Above the starting mechanism above described, the electrical wiring circuits are shown. These circuits begin with a direct current bus bar 101 which connects by wire 102 to a spring-biased, normally-open start button switch 103. The start switch 103 has connections to the first contact 105 and the second contact 107 of a first relay 109. Relay 109 has two contact bars 111 and 113 which engage contacts 105 and 107 when relay 109 is normally positioned (not energized). When coil 115 of relay 109 is energized, the two contact bars 111 and 113 move downwardly to give a connection between contacts 117 and 117' and to break the connection between contacts 105, 105', 107, and 107'. A wire 121 from contact 105' leads to the pulsating ignition coil 123 which is electrically connected to ground wire 124 and to the spark plug 23 by wire 125.

The contact 107' of relay 109 is connected by wire 126 to the fourth contact 127 (opposite contact 127') of the second relay 129. A branch wire 131 from wire 126 connects to the third contact 133 (opposite contact 133') of relay 129. Another branch wire 135 from 126 connects to a wire 137 which leads from contact 133' of relay 129 to switch 59. Wire 141 leads from contact 117' of relay 109 to the actuating coil 143 of relay 129. From contact 117 of relay 109, wire 147 leads to switch 81 and has a branch 149 to coil 115. From wire 102, a connection 151 leads to switch 83 and has a branch 153 to switch 81. Switch 83 connects by wire 155 to speed switch 57 which is connected by wire 157 to contact 127' of relay 129.

Speed switch 59 connects by wire 159 to a bi-metallic, thermally-responsive switch 161 operatively arranged in combustion chamber 17. Wire 163 connects switch 161 to second contact 165 (opposite contact 165') of relay 129. The first contact 167 (opposite contact 167') of relay 129 connects by wire 169 to initiator motor part 43 while contact 167' is connected to wire 163. Valve solenoid 63 is connected by wire 171 to contact 165'. Valve solenoid 67 is connected by wire 173 to wire 163. The upper contact bar 175 connects contacts 167 and 167' and the lower contact bar 177 connects contacts 133 and 133' with relay 129 is normally positioned (without its coil 143 being energized).

Referring to FIGURE 2 which represents the system in the secondary or starting stage, it is apparent that first relay 109 has been pulled down by the action of combustion-pressure-responsive device 77 moving switch 81 upwardly to closed position and thus energizing coil 115. The operation of relay 109 has broken the circuit to ignition coil 123, even assuming the spring-biased start switch 103 was not released to its normally-open position (as shown). The circuit to the operating coil 143 of the second relay 129 is closed so that relay 129 is pulled down. In this stage of operation, it is clear that the only function of relay 109 is to provide the circuit to operating coil 143 of the second relay 129.

As shown, relay 129 provides through bar 177 a connection from switches 83 and 57 (in series) to switches 59 and 161 (in series) and through contact bar 175 a connection from switch 161 to main fuel valve solenoid 63. Valve solenoid 67 continues to be energized from wire 163. Relay 129 has interrupted the power to initiator motor part 43. It is to be noted that, if the combustion temperature exceeds a predetermined limit, thermal switch 161 will cut out both fuel valve solenoids 63 and 67 thus cutting off the fuel supply and shutting down the starting system. Similar operation will result if either speed responsive switch 57 or 59 is actuated.

The operation of the starting system of FIGURES 1 and 2 is begun by closing the start switch 103 which results, through the connections in relay 109, in the energizing of ignition coil 123 and spark plug 23 and, through the connections at relays 109 and 129 and switches 59 and 161, in energizing solenoid 67. Actuated solenoid 67 opens the initiating fuel control valve 65 to provide the easily-ignitable, start-up fuel flow from pump 87 to the spray nozzle 19 in the combustion chamber 17. At the same time, a low-pressurized air supply enters combustor 17 since the compressor 13 is rotated by initiator motor 41 which has been energized via wire 163 contact 175 of relay 129 and wire 169. Motor 41 also rotates fuel pump 87 having a discharge check valve to give a sprayable, low-pressurized fuel after a delay for pressure build-up via gear 85 and gear 35 which simultaneously is rotating compressor 13. Ignition of the rich, start-up mixture occurs and, at a predetermined pressure which results from self-sustaining combustion, the pressure-responsive devices 75 and 77 simultaneously operate to close switches 81 and 83. This action terminates the primary initiating stage of operation and the secondary starting stage of operation begins.

The secondary stage begins by the closing of switches 81 and 83 and immediately results in the cut-out of the initiator motor 41 and the ignition devices 123 and 23. The gas generator is now developing sufficient hot gases to drive the gas producing turbine 27 which powers compressor 13 and to drive the power producing, free turbine 31. Turbine 31 rapidly speeds up the starter reduction gearing 47 and rotates a jet engine connected to connector shaft 51. The combustion products also drive the fuel pump 41 via the compressor turbine 27 and its gear 35 to give a predetermined-high-pressurized fuel flow for injection into the compressed air. The sprag clutch 39 permits gear 37 to overrun motor 41 which is de-energized. It is to be noted that speed-responsive device 55 will shut down the system by means of switch 59 if the turbo-compressor shaft exceeds a predetermined speed as might result if the fuel pressure control failed and hence combustion gases exceed the design limit. The closing of switch 83 puts speed switch 57 overall control of the secondary stage circuit as will appear.

At the beginning of the secondary stage when a predetermined combustion pressure exists, the closing of switches 81 and 83 will energize relay 109 via wire 147 leading to operating coil 115. This action will break the FIGURE 1 circuit at the downwardly-moved contact bar 111 to ignition coil 123 and also will interrupt the FIGURE 1 circuit at contact bar 113. The closing of contacts 117 and 117' in relay 109 (FIGURE 2) will operate relay 129 via coil 143 so that initiator motor 41 is de-energized. Electricity to the solenoid 67 of initiating fuel valve 65 is not cut off since the current by-passes relay 109 and moves from switch 57 through contacts 127' and 127 of relay 129, wire 135, switches 57 and 161 and wire 163 to wire 173. Solenoid 63 of the starting fuel valve is energized to provide the main fuel flow since contact bar 175 engages contacts 165 and 165'.

At the beginning the secondary stage, as indicated by pressure gage 80, the pilot will release the start switch 103. The lock-in of relay 109 prevents starter recycling if the start switch 103 is held during the brief period for the start cycle and the cut-off, at least until after the longer time required for pressure decay in devices 75 and 77.

When the starter has accelerated the aircraft turbine engine to the speed required for its starting (or starter cut-out speed), the mechanically-actuated speed switch 57 will open the circuit to the fuel valves, causing them to close and terminate the start. Sprag clutch 49 permits overrunning of the starter by the aircraft engine. As the combustion pressure decreases, switches 81 and 83 will open, de-energizing the relays 109 and 129 and thus resetting them for the next start.

Referring to FIGURE 3 wherein the same reference numerals have been applied to like parts, the closed start switch 103 and first relay 201 provide current to the initiator motor part 43 so that the turbocompressor of the gas generator of FIGURE 1 and other elements (not shown) are rotated. Electric generator 203 at the left is mechanically linked (dashed line) to tubular shaft 29 so that electricity is generated when the initiator motor is energized. This electricity is supplied through second relay 205 to ignition coil 123 and also through both relays and wire 207 and switches 59 and 161 to initiating fuel valve solenoid 67.

When combustion pressure is generated at the self-sustaining speed for the starting system to begin the secondary stage, switches 81 and 83 will be simultaneously closed, operating relay 205 via coil 209 and thus (1) breaking the circuit to the ignition coil 123 and (2) establishing a circuit to operate via coil 211 the first relay 201. Relay 201 when operated, breaks the circuit to initiator motor part 43. Switch 83 puts the speed switch 57 in the circuit to the actuated second relay 205 which now energizes through wire 207, switches 59 and 161 and through contact bar 213 starting fuel valve solenoid 63. Initiating fuel valve solenoid 67 remains energized through the first relay but the operated second relay, as mentioned, breaks the circuit to the initiator motor part 43. Normal cut-off at a predetermined speed and the safety operation involving self-sustaining combustion, in series overspeed control, and thermal control occur as previously described. It is to be noted electricity from an external source (the aircraft, for example) is required only for operation of the initiator motor.

Referring to FIGURE 4 in which the same parts have previously-used reference numerals, the closed start switch 103 provides current through differential pressure-responsive switch 301 (having sensing element 303 connected to the combustor 17) to initiator motor part 43. All other required electricity is supplied from generator 203 (linked to the rotating turbine-compressor shaft 29) through relay 305. The closed, pressure-responsive switch 307 having sensor 309 passes current to the initiating fuel valve solenoid 67 and ignition coil 123. Wire 311 passes current from relay 305 to the electric fuel pump 313 (having the features of the previously described mechanically-driven pump) and main fuel valve solenoid 67 for the supplying of fuel. When self-sustaining combustion is achieved, the predetermined combustion chamber pressure operates pressure switch 301 and pressure switch 307 to open position. This action shuts off the initiating fuel valve, the initiator motor and the spark plug, terminating the primary stage and beginning the second stage.

Two magnetic pick-ups 315 and 317 are provided and are connected to two resonant reed switches 319 and 321. Pick-ups 315 and 317 are operatively arranged with respect to magnetic projections 323 and 325 respectively on the tubular turbocompressor shaft 29 and the power-producing-turbine shaft 33 so that, at predetermined speeds, the pick-ups energize the resonant reed switches 319 and 321 at their respective resonant frequencies for the closing thereof. When either switch 319 or 321 closes, respectively at predetermined speed of shaft 29 or at a predetermined speed of shaft 33, it triggers by connection to the generator 203 and wire 329 the silicon diode 331 so that current flows from generator 203 through the diode 331 to the operating coil 333 of relay 305 causing it to break via contact bar 335 the circuit to the fuel pump 313 and fuel valve solenoid 63 and hence to shut down the starting system. It is to be noted that switch 301 via wire 341, contact bar 343, and coil 337 of solenoid 339 was locked in upon the generation of combustion pressure. Operation of relay 305 also energizes the coil 337 of the solenoid 339 operatively arranged in respect to the pressure switch 301 so that switch 301 is also electrically locked in the second stage position until the speed decrease opens the operative resonant reed switch. When the pressure decreases to the lower limit of the differential range, switches 301 and 307 will close and another start can be made. Normal cut-off and other operation result as above-referenced in connection with FIGURE 3 except as above described. It is to be noted that the initiating fuel valve is operative only during the primary stage and that there is the same time delay in the supplying of initiating fuel (whereby air pressure builds up) since the electric pump has low pressure discharge check valve.

It is to be understood that changes can be made in the disclosed embodiments of the invention without departing from the invention as set forth in the following claims.

What is claimed is:

1. An air breathing starting system for high speed turbine engines comprised of:

a hot gas generator including an air inlet, a compressor arranged to receive air from said inlet, a first turbine coupled to the compressor, a combustor arranged to receive compressed air from said compressor, fuel supply means and igniting means arranged to admit fuel and to provide ignition temperature in said combustor, said fuel supply means having a fuel pump connected to said first turbine and control fuel valve means, a starter unit having a second turbine free of mechanical connection to said first turbine or said compressor, a power transmission train connected to said second turbine having speed reducing means, an overrunning clutch, and a connector for the turbine engine to be started, gas flow means arranged to direct hot gases from said combustor through said turbines whereby the transmission train and the compressor can be powered, electric means including an electric initiator motor connected to said compressor and control means having a first circuit arranged to provide electricity to said electric motor to rotate said compressor and to operate said control fuel valve means of said fuel supply means and said igniting means to provide self-sustaining combustion in said gas generator for driving said second turbine, said control means having a pressure responsive device operable at a predetermined pressure in said combustor to open said first circuit, said control means having a second circuit which is arranged to be closed when said pressure responsive device is operated and further arranged to interrupt operation of said electric initiator motor and to continue operation of said control fuel valve means, and said control means having speed sensor means directly responsive to the speed of said second turbine and said control means being further arranged to interrupt operation of said control fuel valve means of said fuel supply means to shut down the starter system when said second turbine rotates at a predetermined speed to operate said speed sensor means.

2. An air breathing starting system according to claim 1 and being further characterized by:

said control fuel valve means including an initiating valve having solenoid and a starting valve having a solenoid with said initiating valve being in said first circuit and said starting valve being in said second circuit so that the initiating and starting valves are respectively operative below and above the predetermined pressure in said combustor.

3. An air breathing starting system according to claim 1 and being further characterized by:

said electric means including an electric generator connected to said compressor and arranged to be operative in said first and second circuits.

4. An air breathing starting system according to claim 1 and being further characterized by:

speed sensing means connected to said compressor and arranged to break the circuits to said control fuel valve means at a predetermined speed of said compressor.

5. An air breathing starting system and control for starting turbine engines comprised of:

a coupled compressor and turbine unit having a combustion chamber connected to the outlet of the compressor and arranged to direct combustion gases to the inlet of the turbine, said combustion chamber having fuel supply means arranged to spray fuel into said chamber and electric ignition means therein, said fuel supply means having an initiating solenoid valve and upstream thereof a starting solenoid valve, a first speed sensor switch responsive to the speed of said coupled turbine, a pressure switch responsive to and operable by a predetermined pressure in said combustion chamber, a speed-reducing starter unit having a power turbine arranged to receive the discharge from said coupled turbine and overrunning means for connecting to an engine to be started, an electric initiator motor having overrunning means connected to said coupled compressor and turbine unit, a second speed sensor switch responsive to the speed of said power turbine, electrical means having a start switch and constructed and arranged to connect and to control said initiator motor, said ignition means, said initiating solenoid valve, and said pressure switch so that said initiator motor, said ignition means, said starting solenoid valve are energized when said start switch is closed, said electrical means being further arranged so that operation of said pressure switch at the predetermined pressure provides electricity to said starting solenoid fuel valve and interrupts the supply of electricity to said initiating solenoid valve when said pressure switch closes at a predetermined pressure in said combustion chamber, said first and second speed sensor switches being arranged in said electrical means so that, when said start switch is closed and after said pressure switch is closed, excessive speed will break the circuit to said starting solenoid fuel valves, and said fuel supply means including fuel pressurizing means arranged to be powered by said coupled compressor and turbine unit.

References Cited in the file of this patent

UNITED STATES PATENTS

| | | |
|---|---|---|
| 2,650,060 | Stalker | Aug. 25, 1953 |
| 2,742,758 | Kelly | Apr. 24, 1956 |
| 2,852,911 | West | Sept. 23, 1958 |
| 2,863,283 | Schmider et al. | Dec. 9, 1958 |
| 2,914,918 | Kaplan | Dec. 1, 1959 |
| 2,925,713 | Stevens | Feb. 23, 1960 |
| 2,938,338 | Creswick et al. | May 31, 1960 |

FOREIGN PATENTS

| | | |
|---|---|---|
| 879,749 | Great Britain | Oct. 11, 1961 |